Feb. 28, 1939. T. J. BYRNES 2,149,161
AIR RESISTOR
Filed Feb. 10, 1937
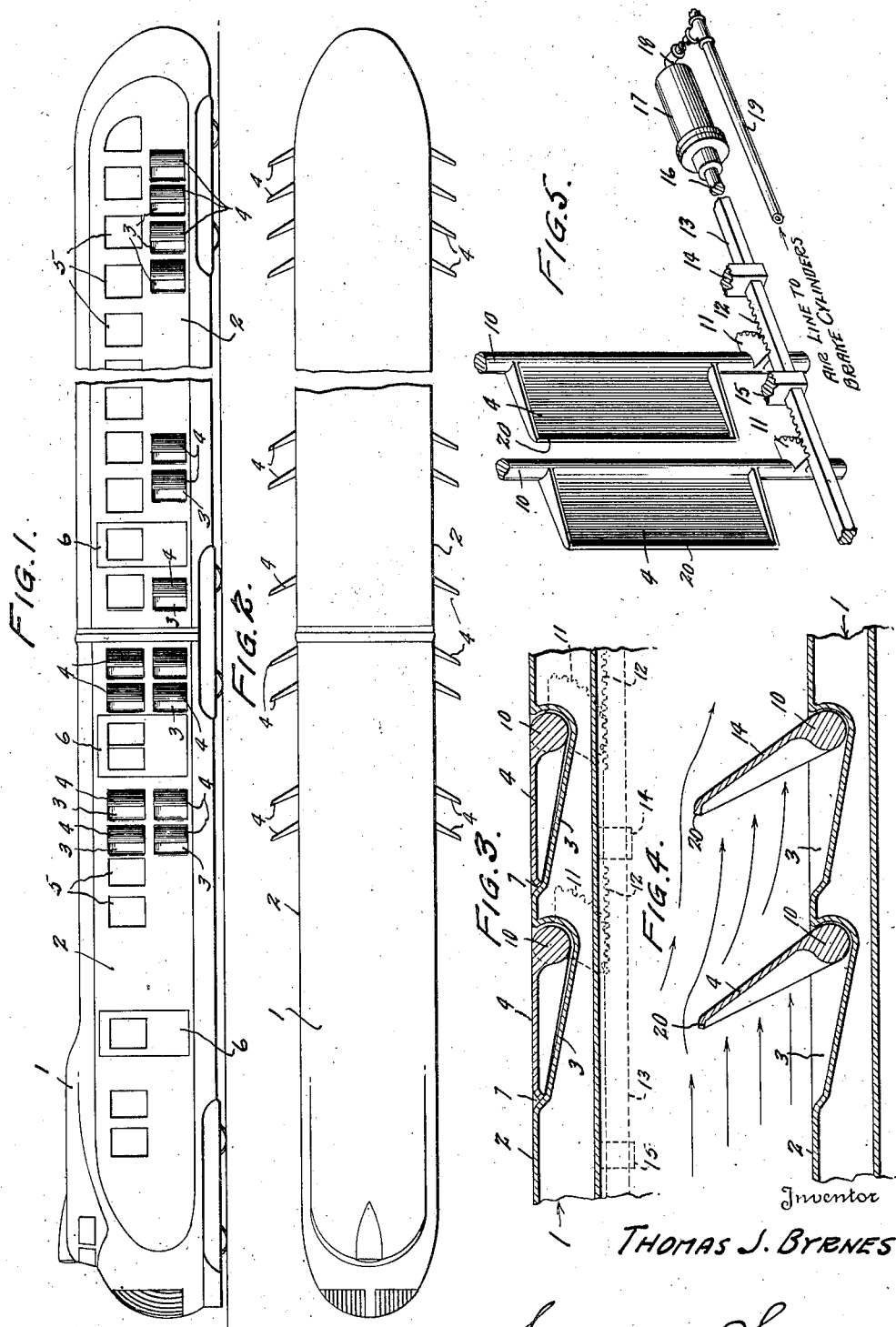
Inventor
THOMAS J. BYRNES
By Semmes & Semmes
Attorneys Patented Feb. 28, 1939

2,149,161

UNITED STATES PATENT OFFICE 2,149,161

AIR RESISTOR

Thomas J. Byrnes, Omaha, Nebr.

Application February 10, 1937, Serial No. 125,152

2 Claims. (Cl. 188—87)

This invention relates in general to a device designed to be attached to a train, motor car, airplane, or other vehicle in such a manner as not to increase the air resistance offered by the vehicle when the device is in inoperative position. When a braking effect is desired, however, this device may be changed into a form which will greatly increase the air resistance offered by the vehicle.

The prior art discloses a variety of vehicles equipped with devices whose wings may be extended into the airflow to act as a braking effect upon the vehicle to which they have been attached.

None of these devices, however, are protected against the weather, and all of them offer considerable resistance to the airflow when in operative position. It should further be noted that the wings disclosed in the prior art are not so shaped as to offer a maximum resistance to the airflow when in operative position. A major object of the present invention is to provide an air stream resistor whose wing is so shaped as to offer a maximum of resistance for the area exposed.

Another object is to provide a wing whose free edge is so curved that, if several winds are used in a row along the outside of a vehicle, each wing will be as effective as the preceding one.

Still another object is to provide an air stream resistor which, when in closed position, will form a continuous curve with the remainder of the body of the vehicle, forming a non-air flow resisting, weatherproof part of the vehicle.

Yet another object is to provide an air stream resistor whose operating means are entirely situated within the body of the vehicle.

Still another object is to provide an air stream resistor which is operated in a convenient and positive manner, and which is cheap to manufacture and easy to repair and replace.

A still further object is to provide a depression in the body of the vehicle into which the wing is received when in closed position.

With these and other objects in view which may be incident to my improvements, the invention consists in the parts and combinations to be hereinafter set forth and claimed, with the understanding that the several necessary elements comprising my invention may be varied in construction, proportions and arrangement, without departing from the spirit and scope of the invention.

The invention illustrated in the accompanying drawing consists of a rectangular wing having an inner edge mounted upon a shaft, and a free edge curving forwardly to the usual direction of travel of the vehicle. When in operative position, the wing always forms less than a right angle with the body of the vehicle, causing the entire wing to have a forward slope. This slope, in combination with the forward curve of the free edge of the resistor, previously mentioned, causes the air just beyond the outer edges of the foremost wing to be drawn inwardly so as to impinge upon a subsequent wing. This leads to a maximum of braking effect if a plurality of air stream resistors are open.

The wing of the air stream resistor is received in a depression formed in the body of the vehicle and forms a continuous curve with the body. The operating mechanism is all either within the depression or the interior of the body and may be operated by a magnetic, air or hydro-actuated piston.

As shown in the attached drawing, there is a plurality of uniformly constructed vanes placed along the sides of the vehicle. Groups of these vanes are maintained at all times in parallel relationship due to the common source of movement from the rack to which each is attached.

The attached drawing discloses the air stream resistor adapted for use in conjunction with a streamlined train, although it can be used for other modes of transportation, such as the automobile and airplane as well.

It is apparent from the drawing hereafter described in detail that the vanes shown are interchangeable. Their uniformity of construction allows this.

In the drawing:

Figure 1 is a side elevation of a streamlined car embodying the streamlined resistor.

Figure 2 is a top plan view of the same.

Figure 3 is a detailed sectional view through two resistors, showing them in closed position.

Figure 4 is a similar view of two resistors in their extended position, the direction of airflow being shown by arrows.

Figure 5 is a detailed perspective view of a pair of resistors showing the operating means.

In the views the device is shown as applied to a streamlined car body 1, having a side portion 2, that is provided by recess portions 3, which may be closed and sealed against the weather by wings 4. The side portion 2 is also equipped with suitable windows 5 and doors 6.

As shown in Figure 2, the wings 4 when in operative position extend outwardly into the air stream, making an angle of less than ninety degrees with the side portion 2.

As best illustrated in Figure 3, the wings 4 when in closed position make a tight fit with the side portion 2 as at 7, thus protecting the operating mechanism against damage from the weather or interference of the operation of the resistor by ice or snow.

As shown in Figure 5, each wing 4 is mounted on a shaft 10 to which is also attached a segmental gear 11. The segmental gear 11 meshes with the teeth 12 of a rack 13, slidably journaled in bearings such as indicated at 14 and 15. The rack 13 is attached to a piston rod 16 which is operated by a piston, not shown, contained within a cylinder 17. Emerging from the cylinder 17 is a branch line 18 which is connected with the regulation air brake line of the train, a portion of which is shown at 19.

In Figure 4 is shown a pair of wings 4 illustrating that their free edges are curved in a forward direction as at 20. This edge, in conjunction with the forward slope of the wing, causes the airflow missed by the free edge of the leading wing to be drawn inwardly and be caught by the following resistor.

It is obvious from the above description that, if compressed air is admitted to the cylinder 17 through the branch line 18 in such a manner that the piston is actuated, the movement of the piston will cause a horizontal movement of the gear shaft 18. This in turn will cause a rotary movement of the shaft 10 because of its connection with rack 13 through segmental gear 11. The wing 4, being rigidly mounted on shaft 10, is thus turned into operative position. A spring (not shown) placed so as to close the piston actuation just mentioned by being attached at one end to the piston or the shaft and at the other end to the frame of vehicle operates to force the rack 13 back into its original position carrying wing 4 on shaft 10 back into inoperative position.

When a streamlined train or other vehicle of modern transportation is run at high speeds, the resistance of the atmosphere becomes an important factor. The present invention, when in inoperative position, offers no resistance to the atmosphere, but when in operative position it can be employed to slacken the speed before the wheel brakes are applied, thus preventing excessive wear of brakes, or it may be used in conjunction with the brakes to effect a much faster stop than if the brakes alone were used.

The device illustrated is simple and economical to manufacture. It may be operated by attaching it to the air line that operates the usual air brakes of the train. In use it will greatly increase the safety of the passengers of high speed vehicles and minimize the wear and tear upon the brake shoes of the train.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. In a braking mechanism for high speed vehicles, a plurality of recesses placed in tandem in that part of the vehicle side wall where substantial straightness of walls lengthwise of the vehicle is exhibited, vanes pivoted and braced wholly within said recesses, the vanes being pivoted at the rear edge thereof, the vanes extending forwardly and nested within the recesses when in inoperative position, said vanes extending outwardly and forwardly when in operative position, curved leading edges of said vanes being aligned with the direction of motion of the vehicle when the vanes are extended to their operative position, said vanes being maintained at all times in parallel relationship, means for operating said vanes simultaneously, whereby said vanes may be operated in tandem from a single control and whereby each vane is able to exert a braking effect substantially undiminished by other vanes in the tandem.

2. In a braking mechanism for high speed vehicles, a plurality of recesses placed in tandem in that part of the vehicle side wall where substantial straightness of walls lengthwise of the vehicle is exhibited, vanes exhibiting a uniformity of construction and of dimensions providing for interchangeability thereof, said vanes pivoted and braced wholly within said recesses, the vanes being pivoted at the rear edge thereof, the vanes extending forwardly and nested within the recesses when in inoperative position, said vanes extending outwardly and forwardly when in operative position, curved leading edges of said vanes being aligned with the direction of motion of the vehicle when the vanes are extended to their operative position, said vanes being maintained at all times in parallel relationship, means for operating said vanes simultaneously.

THOMAS J. BYRNES.